United States Patent [19]
Hughes et al.

[11] 3,838,434
[45] Sept. 24, 1974

[54] UNDERWATER CAMERA HOUSING

[75] Inventors: David Michael Hughes; David S. Fridge, both of Houston, Tex.

[73] Assignee: Oceaneering International, Inc., Houston, Tex.

[22] Filed: June 18, 1973

[21] Appl. No.: 371,064

[52] U.S. Cl. .................................. 354/64
[51] Int. Cl. ............................. G03b 17/08
[58] Field of Search .............. 95/11 UW; 354/64

[56] References Cited
UNITED STATES PATENTS
2,677,996   5/1954   Laval ........................................ 95/11
FOREIGN PATENTS OR APPLICATIONS
1,041,349   10/1958   Germany ............................. 95/11

Primary Examiner—John M. Horan

[57] ABSTRACT

An underwater camera housing having a casing for the receipt of a camera with a closure plate to seal the camera in the casing. The casing has suitable camera operating external levers and handles for operating the camera within the casing from outside thereof.

The casing is affixed to the housing which has a diffuser plate in displaced relationship from where the camera casing is attached thereto. Interiorly of the housing are a pair of lighting capsules to light the area which is to be photographed. Extending from the housing is a shroud in the form of a flexible material for placement of the housing and shroud in close juxtaposition to an object to be photographed so that clear water or an optically clear fluid can be pumped into the housing and diffused through the diffuser plate to the shroud. This serves to maintain a clear area in front of the camera for purposes of flushing out murky water and maintaining a proper view of the object to be photographed. The clear water provided to the housing can be from any particular surface source and led through a pipe to the housing.

5 Claims, 7 Drawing Figures

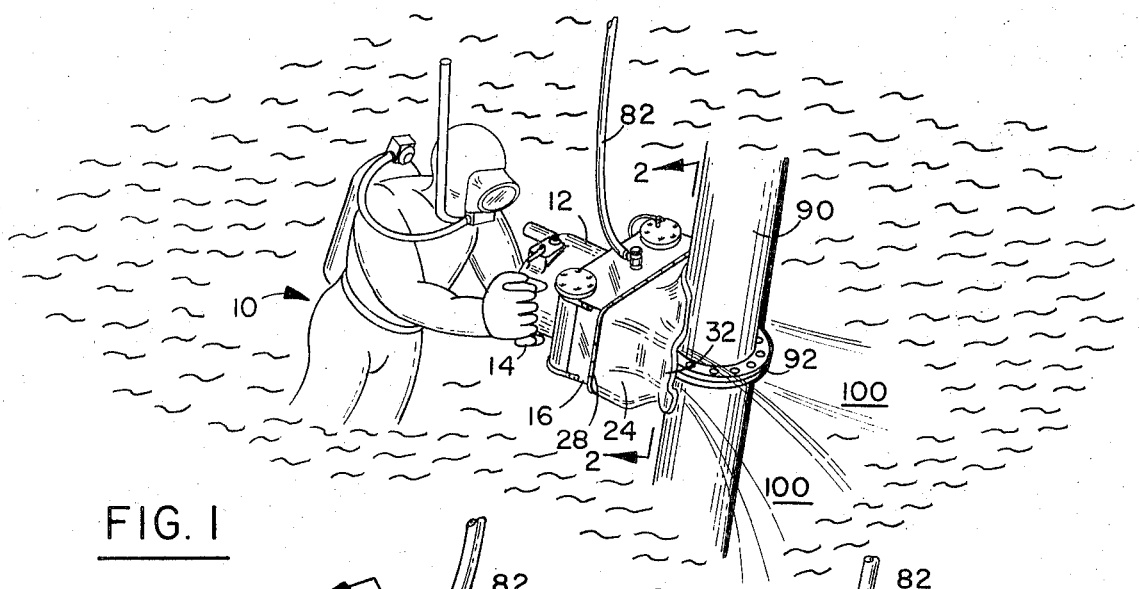
FIG. 1
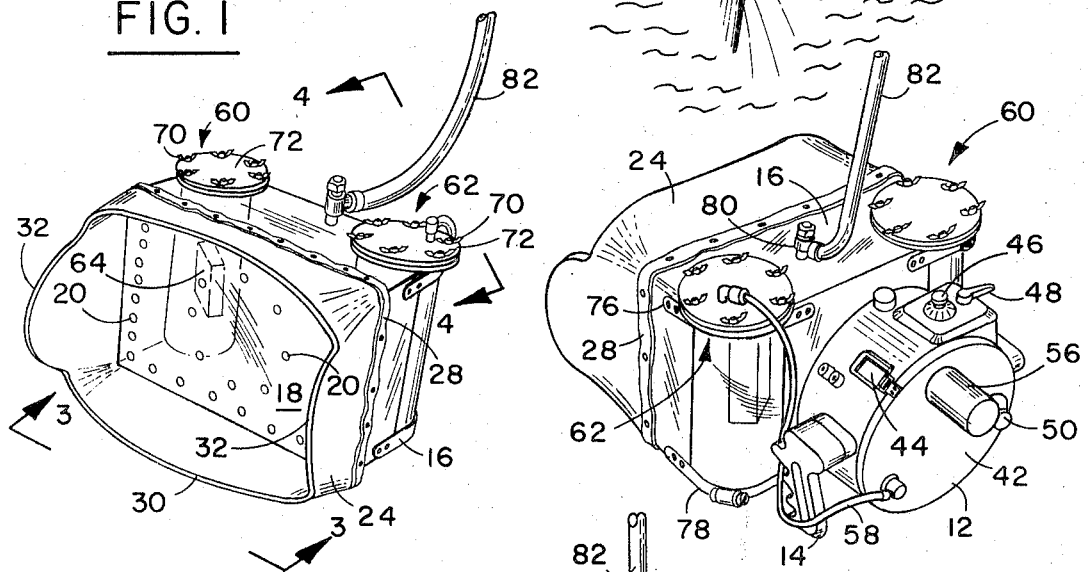
FIG. 2
FIG. 4
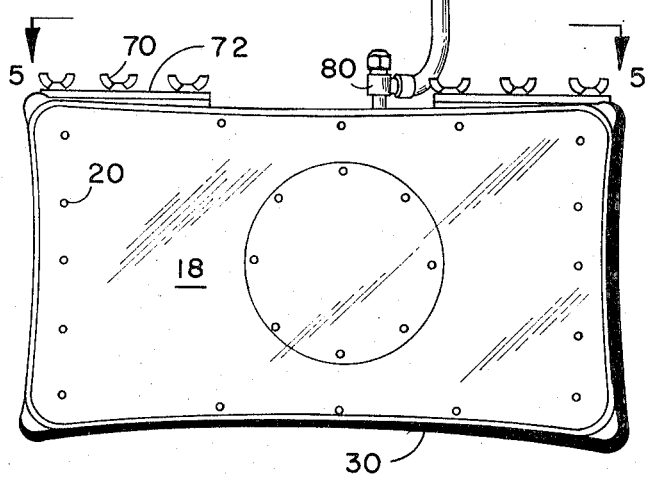
FIG. 3

UNDERWATER CAMERA HOUSING

BACKGROUND OF THE INVENTION

1. Field of the Invention

The field of this invention lies within the underwater photographic art.

2. The Prior Art

The prior art relating to underwater photography has generally involved the use of cameras that are sealed and can be operated from underwater depths. The cameras oftentimes are utilized in areas where there is substantial murkiness in the water. The murkiness of the viewing area is increased when there is certain activity which stirs up the bottom and creates colloidal suspensions floating within the ambit of the camera view. It has been known that oftentimes a picture cannot be properly taken because of the lack of clarity.

In addition to the foregoing lack of ambient clarity, the use of lighting means at certain depths becomes difficult when there are certain colloidal suspensions. In particular, the colloidal suspensions can cause a hazy reflection of the light. The reflection thus causes inordinate glare which then becomes a source of reflection to the extent where the camera no longer will take a proper and accurate picture. Furthermore, the character of the picture is often distorted, so as to not reveal the details necessary for making an accurate appraisal of the appearance of objects at a depth of water.

The prior art has tried to take pictures in certain areas by accommodating itself to calm days, to avoid the foregoing drawbacks. However, as can be understood, oftentimes pictures have to be taken in any condition to determine the situation below the surface. Furthermore, there are many underwater conditions that always remain murky.

With the increased use of underwater construction, drilling rigs, piers, and oceanographic activity, it is oftentimes necessary to go below the surface and take detailed pictures for later analysis. The pictures not only reveal the existence of natural phenomena but also show the character of man-made objects. It is in these situations that it is necessary and desirable to take a picture of the affected area. The pictures must be accurate, detailed, and capable of showing the points of failure, prospective rupture, fatigue or general appearance.

The foregoing is necessary for purposes of maintenance and also assessing the character of environmental impact on the water bodies that are being examined. As a consequence, this invention finds great use in not only the maintenance, repair, and overall picture taking of man-made structures, but also is important from the standpoint of enhancing accurate pictures that can be taken of the oceanographic ecology.

SUMMARY OF THE INVENTION

In summation, this invention comprises a new means for taking underwater pictures in murky areas by means of an optically clear liquid such as clear water being introduced to the area adjacent that area being photographed.

More particularly, the invention incorporates a camera casing attached to a housing connected to a source of clear water or an optically clear solution. The clear water is delivered to the housing through which the picture is taken from the camera casing. As the water is delivered to the housing it is diffused through a diffusion plate having a plurality of openings therein. The diffusion plate allows the perfusion of clear water into an area extrinsic of the camera housing and is generally surrounded by a flexible shroud. The diffusion plate also helps to prevent the re-introduction of murky water into the viewing area by reason of the small holes therein which serve to maintain an optically clear fluid therein from being diluted with murky water. The shroud helps to maintain the general area in front of the camera lens substantially free of murky sediment, or other colloidal suspension. The clear water is delivered to provide not only a clear area through which a view can be taken, but also maintains the removal of colloidal or murky water on a consistently flushed basis. Furthermore, the placement of the water behind the diffusion plate limits the entrance of murky water prior to the pressurized delivery of clear water.

The housing can be provided with a lighting means as well as the camera casing so that the entire area can be floodlit in an optimum manner at the area where the picture is being taken.

BRIEF DESCRIPTION OF THE DRAWINGS

The invention will be more clearly understood by reference to the description below taken in conjunction with the accompanying drawings wherein:

FIG. 1 shows a perspective view of the invention being used by a diver in an underwater location;

FIG. 2 shows a perspective view of the invention in the direction of lines 2—2 of FIG. 1;

FIG. 3 shows a front elevation view of the invention in the direction of lines 3—3 of FIG. 2;

FIG. 4 shows a rear quarter perspective view of the invention in the direction of lines 4—4 of FIG. 2;

DESCRIPTION OF THE PREFERRED EMBODIMENTS

Figure 5:
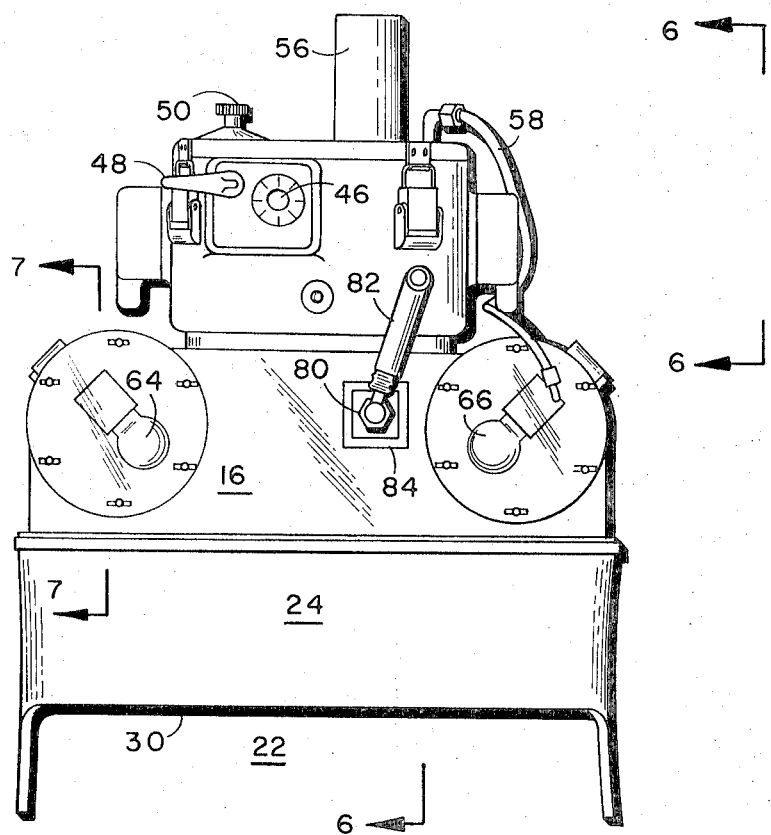
FIG. 5 shows a top plan view of the invention along lines 5—5 of FIG. 3.
Figure 6:
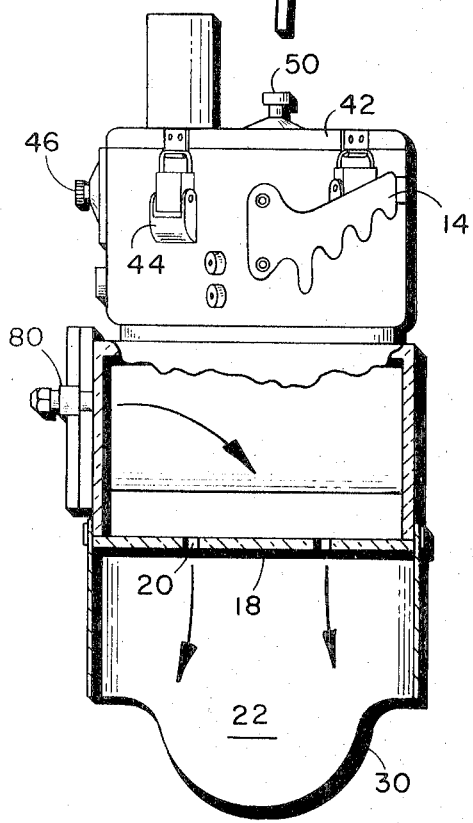
FIG. 6 shows a partially sectioned and fragmented side elevation view through the section of lines 6—6 of FIG. 5; and, FIG. 7 shows a sectioned view through lines 7—7 of FIG. 5.
Figure 7:
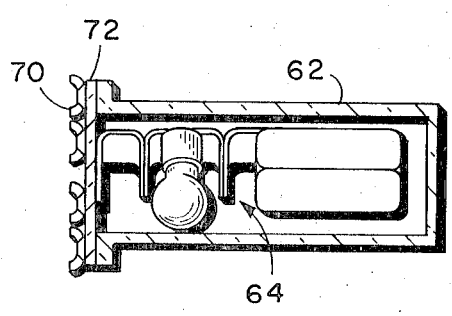

Looking at the figures wherein like numbered parts apply to all of the respective figures, a diver 10 is shown with normal diving apparatus holding a camera casing 12 by means of handles 14. The handles 14 are secured to the side of the casing 12 in any suitable manner such as by screws, or bolts. The handles 14 can be formed in any suitable manner providing a grip to the diver 10.

The casing 12 is attached to a housing 16 which is formed as a generally rectangularly configured housing. The housing or box 16 can be formed from a clear plastic such as plexiglass, or any other suitable material as long as it effectuates the proper viewing by the camera in a manner to be described.

The housing 16 has a front plate 18 which can be formed as a diffuser plate having a plurality of openings 20 therein. The openings 20 serve to permit the passage of water into the general area 22 surrounded by a shroud 24. The shroud 24 can be formed from any suitable material such as rubber, resilient pliable plastic, neoprene, or any other flexible material. The shroud may be transparent or opaque, depending upon the particular use that the diver is to make of the camera casing 12.

The shroud 24 is secured to the housing 16 by means of a band 28 that circumscribes the housing and secures the shroud thereto by means of rivets, screws, or any other suitable fastening means. The band 28 can be eliminated in the eventuality the shroud 24 is secured by an adhesive to the housing 16.

The shroud 24 can be formed so that it has a flexible outer lip 30 that will conform to equipment that it is impressed against for purposes of taking a picture thereof. However, the lip 30 can be configured in any suitable manner and provided with ears 32 which can serve to wrap around an object to form a clearer view and a greater concentration of optically clear fluid as will be described.

The camera casing 12 is provided with a cover 42 which has snap buckles 44 attached thereto. The snap buckles 44 are secured to the main part of the cylindrical part of the casing 12. In this manner the cover 42 can be closed over the casing 12 in order to secure and protect a camera placed therein from the incursion of water into the casing.

The camera casing 12 has an external knob for speed which can be dialed to a camera therein, such as by means of a knob 46. It also has a shutter attachment 48 and a lens opening control means 50 secured thereto. The foregoing showing of the control elements for the camera are substantially illustrative of the types of control elements that can be utilized. However, depending upon the camera, the type of mounting for the camera in the casing 12, and the other attendant factors related thereto, the foregoing control devices can be placed in various configurations and used in various forms.

The camera casing 2 has a viewing portion in the form of a clear plastic cylinder 56. The viewing portion 56 enables one to see the area 22 circumscribed by the shroud 24 so as to create a view of the object being photographed. The viewing port can be of any suitable configuration as long as it allows access by the user to the specific camera view finder held internally of the casing 12.

A cable 58 leads from the camera casing for purposes of controlling the lighting means internally of a pair of light capsules 60 and 62. The lighting capsules contain a respective pair of light sources 64 and 66 which serve to illuminate the area internally of the opening 22. The lighting sources 64 and 66 can be incandescent bulbs, strobes, or any other type of light whether it be of a high or low intensity. Behind each of the lights, a reflective surface can be utilized to intensify the placement of the light on the object into the general area 22. Furthermore, parabolic reflectors, curved reflectors and other shapes and planar surfaces can be utilized both behind the lighting means 64 and 66 as well as on the interior surface of the capsules 60 and 62.

Looking more specifically at the capsules 60 and 62, it is seen that each capsule has a series of butterfly nuts 70 which serve to secure lids 72 onto the capsules. The butterfly nuts 70 can be substituted by any other suitable holding means to secure the lids 72 to the housing of the capsule. It is not necessarily incumbent for the operation of the invention that the capsules 60 and 62 be secured to the housing 16, but can form a portion thereof in any suitable configuration so long as they seal the light source against water. The capsules 60 and 62 can be placed as separate capsules interiorly of the housing 16 by means of bands 76 and 78. The bands 76 and 78 can be placed at the upper and lower respective regions of the capsules 60 and 62 which partially circumscribe their circumference to hold them in tightened juxtaposition to the housing 16. In addition to the bands 76 and 78, the capsules can be formed of any suitable material and welded or adhered to the housing 16 by an adhesive or thermosetting resin of any suitable type.

The housing 16 has a fluid connecting inlet 80 in the form of a hose connection which receives a hose or tube 82. The hose connection 80 can be formed in any suitable manner and seated within the housing 16 with an appropriate fitting such as a square block 84 that serves to receive the hose fitting 80. The square block 84 can be utilized to effectively secure the hose fitting 80 regardless of its configuration. Also, the hose fitting can be utilized with a securement nut on either side thereof to hold it within the wall of the housing 16.

The hose 82 is connected to a source of fresh or clear water, an optically clear fluid, or any fluid supply which will provide a clear and unobstructed non-murky view through the area of the box and within the diffusion area 22. The source of optically clear fluid can be supplied by any suitable means such as a pump, or a pressurized reservoir having a fluid pressure vessel attached to a source of optically clear liquid. Regardless of the means for delivering fluid to the housing 16, it should be emphasized that the liquid is to be delivered at a rate consonant with that required to displace the murky water within the box 16 as well as the diffusion area 22 in front of the diffuser plate 18.

The diffuser plate 18 has been shown with a plurality of openings 20 formed from a relatively stiffened material as a wall of the housing 16. However, the diffuser plate 18 can be of a flexible nature so that it will form and bend to the particular configuration which it is to take a picture of. In other words, the diffuser plate 18 can be a substantially flexible material such as those plastics known in the art which will conform to any particular surface when a liquid is placed therein. In this manner, the diffuser plate 18 can be pressed against an object such as a pipe 90 having a flange 92 to take a detailed picture thereof. If the diffuser plate 18 is flexible when pressed against the flange 92, it will then conform and wrap around the edges of the flange for a detailed close view without the obstruction of murky water between the plate 18 and the flange 92.

In addition to the foregoing advantages of a flexible diffuser plate, the entire device can be made so that the plurality of openings 20 are not implaced in the diffuser plate. In other words, the flushing action can take place from any suitable source. This accomplishes two things. Firstly, it allows a flexible diffuser plate to conform to an object which is to be photographed and secondly it allows for a flushing action in the region where it is required.

In addition to the shroud 24 having the ears 32, the outer edge of the shroud 24 can be configured with a number of different conformations. Specifically, the shroud 24 can be formed with diffusion openings of its own and a sealing lip which will be placed in relatively close juxtaposition to an object to be photographed. Specifically, the edge 30 of the shroud 24 can be configured so that if a round object is to be photographed, the shroud can be formed so that the edge 30 will follow a rounded contour. Furthermore, if any other object is to be photographed, the edge 30 can be configured to follow for such conformation.

The entire foregoing camera housing embodiment can be formed so that the device will operate at any particular depth at which the diver is, by the proper seals for the camera casing 12 as well as the proper pressure and hose lengths, for the hose delivery of optically clear fluid such as water.

As an aside, it should be noted that the diffuser plate 18 provides a significant function in addition to allowing the flow of clear fluid in front of the camera lens. Specifically, it serves to prevent in part the introduction of murky fluid into the box or housing 16. After the murky fluid has been displaced, the limited holes in the plate 18 serve to prevent the re-introduction of murky fluid even when pressurized fluid is not flowing thereinto.

OPERATION OF THE INVENTION

In operation, the housing 16 is placed at the particular depth where the photograph is to be taken. The camera mounted in the casing 12 is loaded with film and made ready by the appropriate adjustments on the exterior of the camera casing.

The optically clear fluid or clear water can be initially delivered through the pipe 82 on a modified basis to maintain the enclosure formed by the housing 16 relatively clear. The fluid can be fed into the space 22 outlined by the shroud to keep an optically clear area up to and surrounding the object to be photographed.

The housing 16 can be continuously fed water through the pipe 82 so as to flush out any murky sediment, water, colloidal suspensions, and other deleterious materials. The water, as it is flushed or perfused through the openings 20 of the diffuser plate 18 effectuates a constant replenishment of clear water within the shroud as well as the housing, causing a flushing action thereof.

As previously indicated, the diffuser plate 18 can be made of a flexible material and utilized by impressment against a compound surface such as the flange 92, which is being pictured. In this manner, a closer positioning of the shroud and camera can be effectuated as well as in some cases an exact placement of the diffuser plate against the object to be photographed. The plurality of openings 20 can be constantly supplied clear optical fluid such as clear water thereto. Also, a substantially closed shroud can be utilized in conjunction with a diffuser plate 18 having no holes 20. In such an embodiment the fluid is delivered by means other than openings 20. Also, the diffuser plate can be flexibly implaced against an object to be photographed, thereby wrapping partially around it and creating an exact placement of clear fluid against the object without the requirement of constantly flushing water through the plurality of openings 20.

As the fresh water is pumped into the housing 16, it comes out in the form of a gentle stream shown as streams 100, in the direction of the area to be photographed. As a consequence, there is a constant flushing of the area 22 in front of the camera. This causes a continual washing away of the murky fluid or other colloidal suspensions so that a clear fluid is seen through which a picture can be taken. However, even when the fluid is not flushing under pressure, the diffuser plate 18 and the limited openings therein help to prevent the re-entry of murky ambient water into the housing 16.

As can be appreciated, the shroud 24 tends to shield the fluid that is being pumped in part from the surrounding murky fluid so that it escapes between the seal of the shroud and the object to be photographed. However, other suitable means for allowing the escape of fluid from the shroud 24 can be utilized, such as holes and openings within the shroud.

While the fluid is being pumped or a clear face is being maintained in front of the camera and the box, the camera can be operated through the various operating means on the casing 12.

VARIATIONS

As can be understood, various configurations and modifications can be utilized for this invention.

Specifically, the shroud 24 can be formed of any particular flexible material to accommodate a particular surface. The outer edge 30 can be formed to accommodate itself to the surfaces against which it is applied. In addition thereto, the interior of the shroud can be formed so that it forms compound curves suitable for implacement against various structures that are to be photographed. As can be appreciated, the shroud 24 can be movable and formed in various configurations so that it can be substituted alternatively depending upon the particular area or equipment to be photographed.

In addition to the different combinations of the shroud 24, the diffuser plate 18 can be configured so that it is a flexible member without a plurality of openings 20. In this manner, it can be implaced directly against the item to be photographed, thereby creating a direct clear picture to the object to be photographed through the housing 16 to the point of the exterior surface of the plate 18.

The foregoing configurations of the housing 16, shroud 24, and diffuser plate 18 can be used with any suitably configured lighting capsules or lighting means. In addition thereto, various casings 12 for the camera can be used so as to accommodate various types of cameras.

It can thus be seen that this invention has various modifications and equivalents that can be effectuated within the teachings thereof. As a consequence, this invention is only to be read in light of the following claims.

We claim:

1. Underwater photographic apparatus comprising:
   means for holding a camera having control means extending therefrom for operating the camera;
   a housing connected to said means for holding a camera providing a field of view to the camera lens therethrough;
   connection means for delivery of an optically clear fluid to said housing;
   a diffuser plate forming a wall of said housing in front of where the lens of the camera is located for allowing the camera to view the object to be photographed therethrough and through the optically clear fluid; and,
   a plurality of openings within said diffuser plate for the perfusion of the optically clear fluid therethrough and to the outer surface of said plate for displacing at least in part any murky fluid in front of said diffuser plate within the field of the camera.

2. The apparatus as claimed in claim 1 further comprising:
   a flexible plate on said housing for impressment against the object to be photographed to provide a substantially conforming surface to the object.

3. The apparatus as claimed in claim 1 further comprising:
   a shroud surrounding at least in part said diffuser plate for purposes of maintaining a higher density of optically clear fluid in areas surrounded by said shroud.

4. The apparatus as claimed in claim 3 further comprising:
   a detachable shroud configured to conform to the general configuration against which it is implaced for photographic purposes.

5. The apparatus as claimed in claim 1 further comprising:
   lighting means within said housing encased in at least one container in said housing for illuminating the area to be photographed.

* * * * *